No. 671,456. Patented Apr. 9, 1901.
W. G. STOLZ.
CHANGEABLE GEAR.
(Application filed Feb. 5, 1901.)
(No Model.)
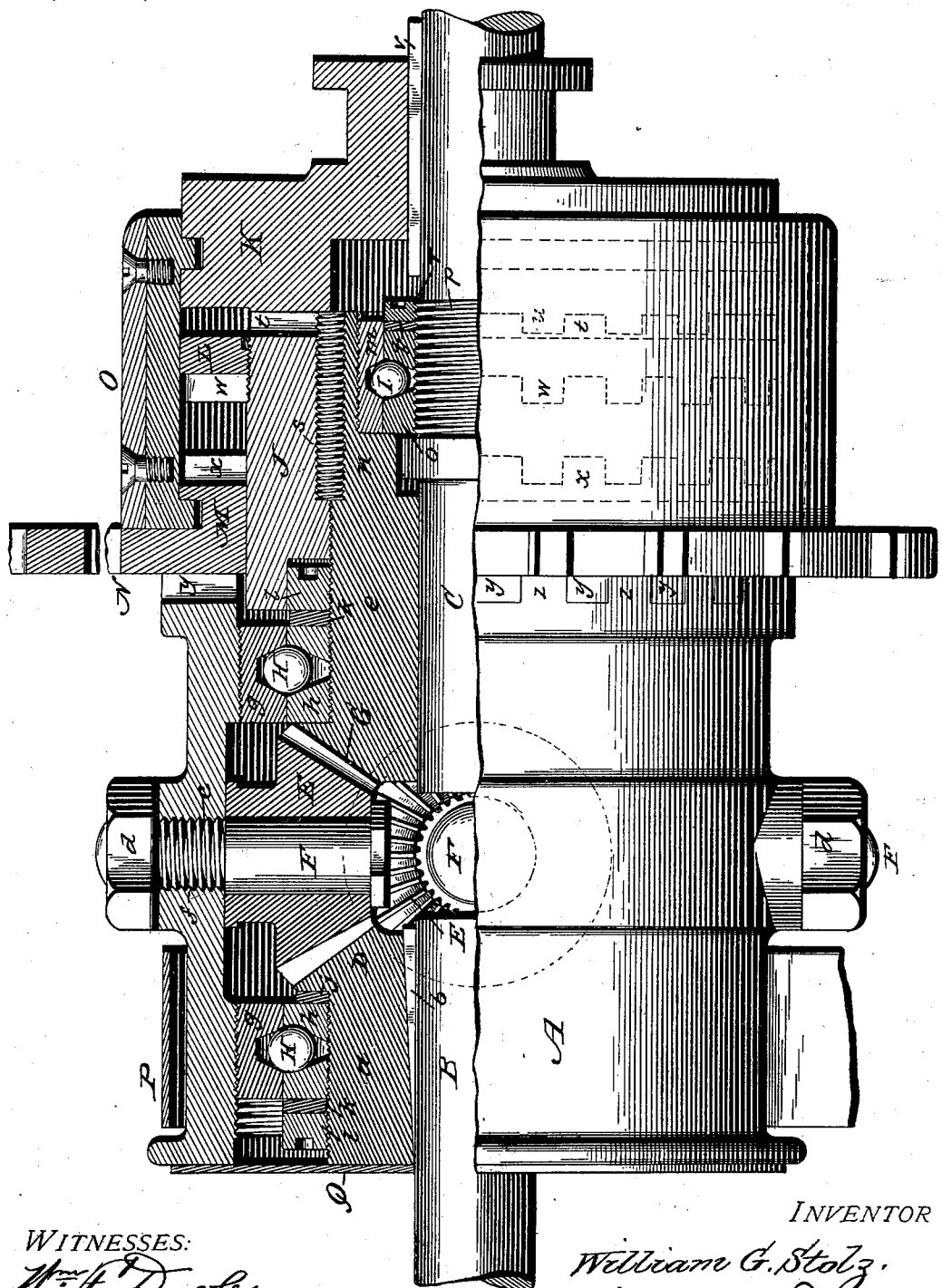
WITNESSES:
INVENTOR
William G. Stolz.
BY Chas. H. Fowler
Attorney

UNITED STATES PATENT OFFICE.

WILLIAM G. STOLZ, OF BROOKLYN, NEW YORK.

CHANGEABLE GEAR.

SPECIFICATION forming part of Letters Patent No. 671,456, dated April 9, 1901.

Application filed February 5, 1901. Serial No. 46,041. (No model.)

*To all whom it may concern:*

Be it known that I, WILLIAM G. STOLZ, a citizen of the United States, residing at Brooklyn, in the county of Kings and State of New York, have invented certain new and useful Improvements in Changeable Gear; and I do hereby declare that the following is a full, clear, and exact description of the same, reference being had to the annexed drawings, making a part of this specification, and to the letters of reference marked thereon.

The present invention has relation to that class of changeable or differential gear designed for use on automobiles and other motor vehicles, cycles, power-driven launches, pulleys, and like class of mechanism requiring a reverse or direct forward motion and compensating motion and in which the driving mechanism may be released from operating the changeable gear, as well as a brake mechanism to stop the motion of the gear either in a forward or reverse action.

The invention consists of a changeable gear constructed substantially as shown in the drawing and as hereinafter described and claimed.

In the accompanying drawing, which represents a part-longitudinal section of a gear constructed in accordance with my invention, A designates a hub or casing, which may be of any preferred form and construction, and through this hub or casing extends the shafts B C, which may also be of any desirable construction. Upon the inner end of the shaft B is secured an exteriorly-screw-threaded hub $a$ by means of a suitable key $b$ or by any other desirable and well-known means, said hub being rotatable with the shaft and having a bevel gear-wheel D, which meshes with the teeth of a bevel-pinion E. This pinion E is rotatable upon a stationary screw-bolt bearing F, which has a screw-threaded shank $c$, extending through and engaging with a screw-threaded hole $f$ in the hub or casing A, a suitable nut $d$, which engages the screw-shank, locking the bolt-bearing to the hub or casing, or any suitable means may be provided for securing the bolt-bearing in place and to the hub or casing. A second bevel gear-wheel G engages with the pinion E, and its hub $e$ is loosely mounted upon the shaft C, said gear-wheels and their hubs being integral, the hub $a$ being fixed or keyed to its shaft, as hereinbefore described, while the hub $e$ is loose upon its shaft. Any number of the pinions E may be used, with their respective gear-wheels D and G, as found most desirable, the pinions and gear-wheels being of any suitable form and construction and of any desirable size best adapted to the purpose.

Suitable ball-bearings are provided for allowing free action of the gearing when compensating or reversing, which bearings also act as a thrust to hold the gear-wheels in mesh with the pinions. These bearings consist of the grooved rings $g$ $h$, between which are the balls H, the grooved rings $g$ being connected to the interior of the hub or casing A by screw-threads, and the grooved rings $h$ are secured in like manner to the hubs $a$ and $e$, as shown, the rings $h$ being in two sections, and upon the outer sides thereof are the usual washers $j$ $k$ and the lock-nut $l$ to tighten up the two sections of the ring $h$ to compensate for wear.

Any suitable ball-bearing may be used in place of that shown, as I do not desire to confine my invention to any particular bearings, as ball or other bearing of whatever form may be employed so long as it serves the purpose intended.

A third ball-bearing is provided to hold the shaft C in its relative position to the gearing, said bearing comprising the grooved ring $m$, secured to the extension $n$ of the hub $e$, and the sectional grooved ring $o$, secured to the screw-threads $p$ upon the shaft. The balls I are located between the rings $m$ $o$, and a washer $q$ and nut-lock $r$ are employed to adjust the sectional ring in compensating for wear. A sleeve J is screwed on the exterior of the hub $e$ and is prevented from turning thereon by a locking-screw $s$, or any other means may be employed, as found preferable. This sleeve J is formed with teeth $t$ upon the outer end thereof, which engage teeth $u$ upon a shifting clutch K, said clutch sliding upon the shaft C and prevented from turning thereon by a feather $v$. The sleeve J has a collar L, having clutch-teeth $w$, which are adapted to engage similar teeth $x$ on the hub M of a sprocket-wheel N or other driving medium, said hub being loosely mounted upon the sleeve J, so that it can slide back and forward thereon. This hub M has clutch-teeth $y$, which are adapted to engage similar teeth $z$ on the hub or casing A. The hub M of the sprocket-wheel and the shifting clutch K are connected together by a coupling-band O, which coupling may be of any suitable construction or any means employed that will connect the sprocket-wheel and the shifting clutch together, so that the clutch-teeth on the hub of said wheel and the clutch-teeth of the shifting clutch will engage or disengage simultaneously and respectively the teeth on the hub or casing A and the teeth of the sleeve J.

A suitable brake-band P may be employed, and also a dust-cap Q, which may be of the usual construction.

In describing the several parts of the gearing I desire it understood that many changes or modifications may be resorted to without in any manner affecting the essential features of the invention, and any such changes in the details of construction as would come within ordinary mechanical skill may be made without departing from the principle of the invention.

The independent shaft B, having keyed thereto the gear-wheel D, the independent shaft C, and the gear-wheel G, loosely mounted upon said shaft, together with the pinions E, connected to the casing A, admits of a perfect action of the parts in compensating.

The several parts as shown in the drawings are in their relative position when on the forward motion, the clutch-teeth $u$ and $t$ engaging each other and also the clutch-teeth $y$ and $z$, thereby allowing either or both of the shafts to compensate.

One of the essential features of the invention resides in the clutch mechanism, comprising the clutch-teeth $z$ upon the end of the hub or casing A, the sprocket-wheel N, provided with clutch-teeth $y$ to engage the clutch-teeth on the hub or casing and also clutch-teeth $x$ upon the opposite side of the wheel to engage the clutch-teeth $w$, the clutch-teeth $u$ upon the shifting clutch K adapted to engage the clutch-teeth $t$ upon the sleeve J. This clutch mechanism above described, in connection with the coupling of clutch K and sprocket-wheel or driving medium N together, so that they will slide simultaneously, is an essential feature of the invention and considered of material importance in providing a perfectly-acting changeable gear. When the reverse motion is required, the shifting clutch K is moved by a suitable lever or other means usually employed until the clutch-teeth $w$ and $x$ are engaged and the band-brake P held tight on the hub or casing A, which will give a reverse motion of the shaft B. When the clutch-teeth of the sprocket-wheel and the clutch-teeth of the slidable clutch are free from contact with the other clutch-teeth, the sprocket-wheel will revolve loosely on the sleeve J and leave the changeable gear idle.

It is evident that in place of the sprocket-wheel any belt-pulley or gear-wheel may be substituted, depending entirely upon the use to which the changeable gear is applied. Also a single shaft may be used in place of the two shafts shown in the drawing.

Having now fully described my invention, what I claim as new, and desire to secure by Letters Patent, is—

1. A changeable gear comprising a hub or casing, suitable pinions connected thereto, two independent shafts, gear-wheels carried thereby to engage the pinions, and a slidable driving medium having clutch-teeth upon both its sides and adapted to engage or disengage other clutch-teeth of the gear, substantially as and for the purpose described.

2. A changeable gear comprising a suitable hub or casing, a shaft and gearing connecting therewith, a suitable driving medium having clutch-teeth upon both its sides and connecting with a clutch member having clutch-teeth through the medium of a coupling, said clutch-teeth adapted to engage or disengage other clutch-teeth of the gear, substantially as and for the purpose specified.

3. A reversing mechanism for changeable gear, comprising a suitable hub or casing having clutch-teeth upon its end, a sleeve having clutch-teeth upon its outer end, a collar on the sleeve having clutch-teeth, a suitable driving medium having clutch-teeth upon both its sides and adapted to engage or disengage the clutch-teeth upon the hub or casing and the collar, and a clutch coupled to the gear and adapted to operate substantially as and for the purpose set forth.

In testimony that I claim the above I have hereunto subscribed my name in the presence of two witnesses.

WILLIAM G. STOLZ.

Witnesses:
GEORGE M. BOND,
C. M. FORREST.